Figure 1:
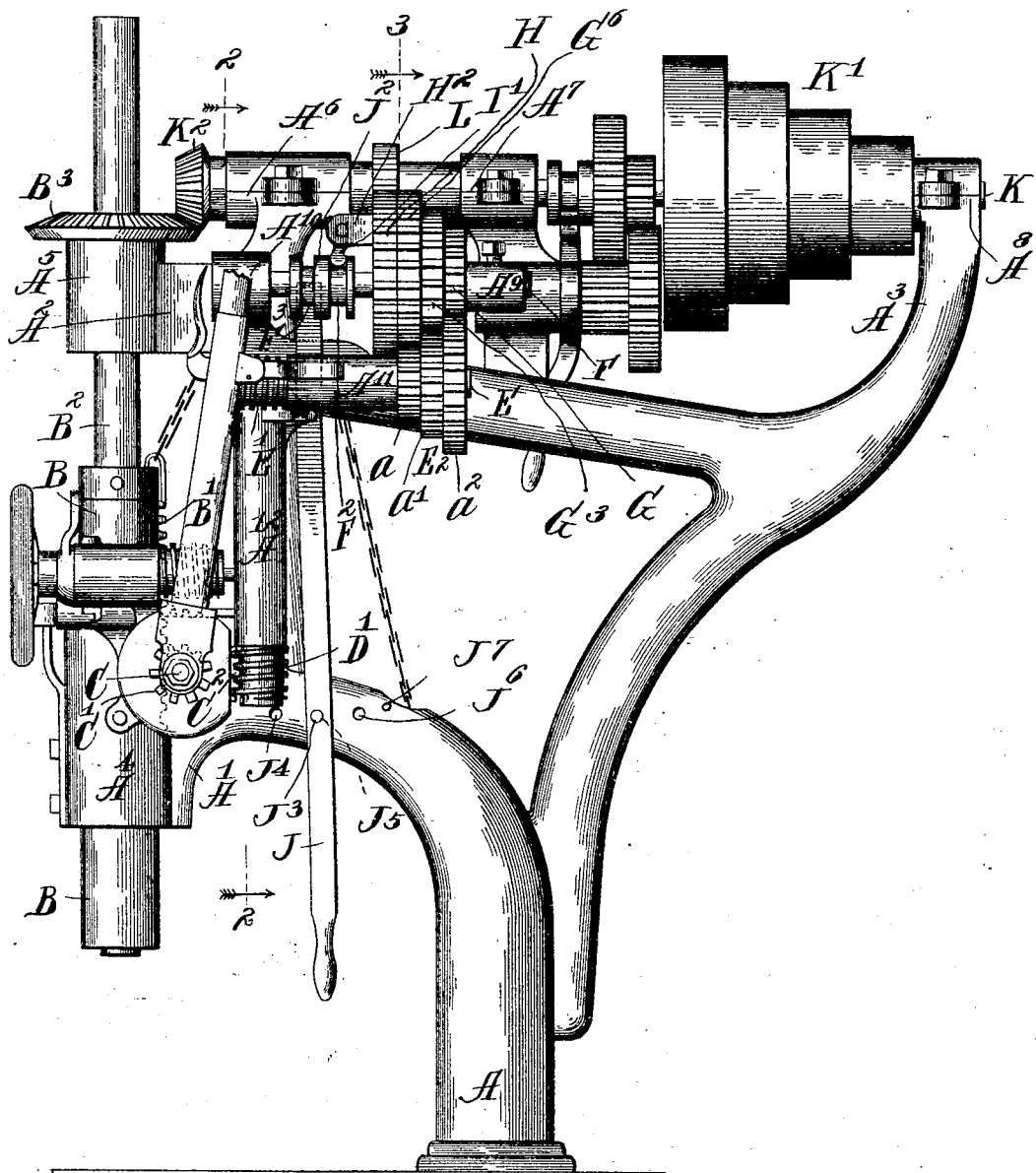

No. 809,372. PATENTED JAN. 9, 1906.
E. A. HOEFER.
VARIABLE SPEED GEAR.
APPLICATION FILED JULY 29, 1905.

3 SHEETS—SHEET 1.

Witnesses.
Inventor.
Emil A. Hoefer,
By
Atty

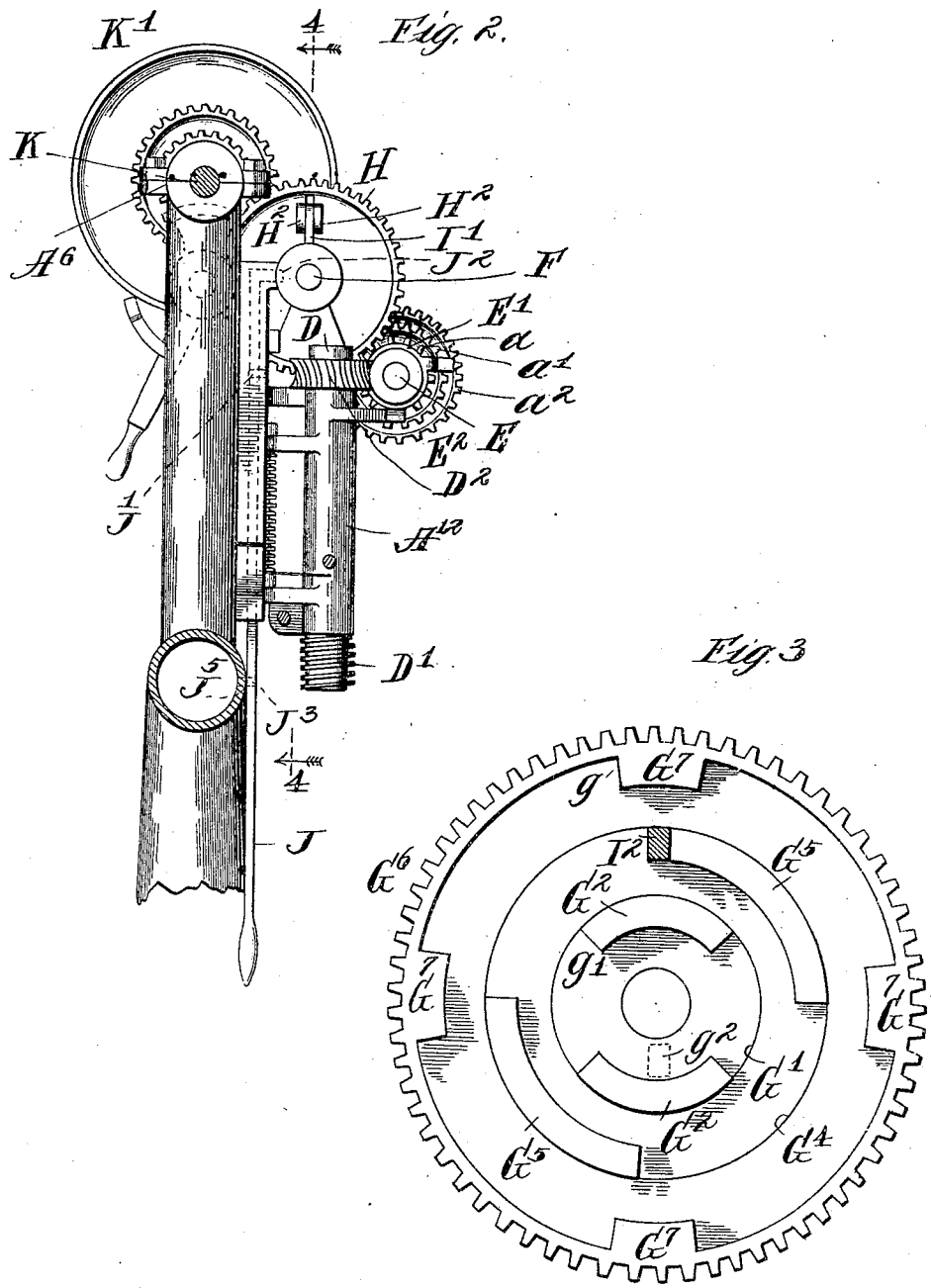

No. 809,372. PATENTED JAN. 9, 1906.
E. A. HOEFER.
VARIABLE SPEED GEAR.
APPLICATION FILED JULY 29, 1905.
3 SHEETS—SHEET 3.
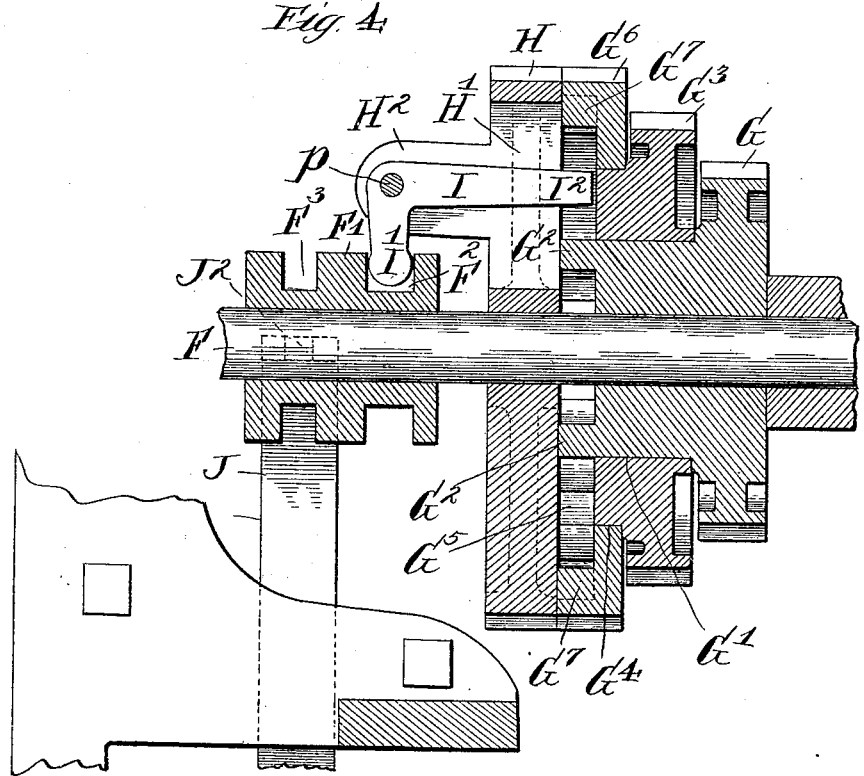
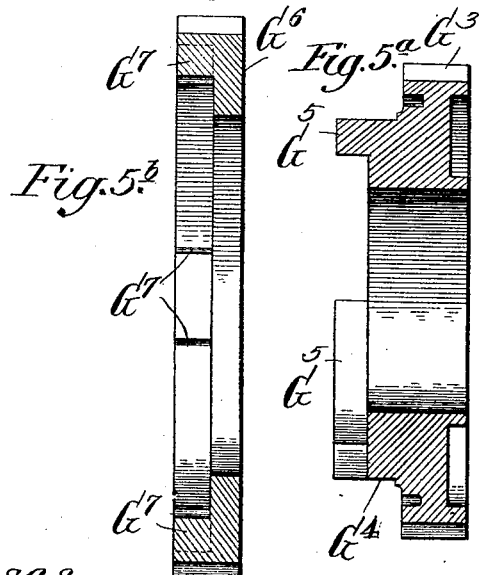
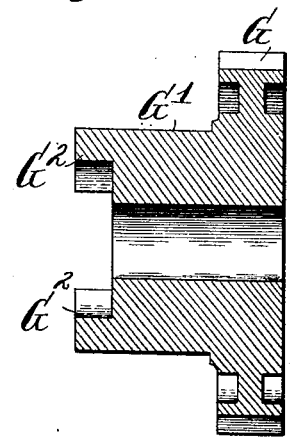
Witnesses.
G. A. Nauberschmidt
Nellie E. Ennett.
Inventor:
Emil H. Hoefer,
By L. G. Worrinan.
Atty

UNITED STATES PATENT OFFICE.

EMIL A. HOEFER, OF FREEPORT, ILLINOIS, ASSIGNOR TO HOEFER MANUFACTURING COMPANY, OF FREEPORT, ILLINOIS.

VARIABLE-SPEED GEAR.

No. 809,372.   Specification of Letters Patent.   Patented Jan. 9, 1906.

Application filed July 29, 1905. Serial No. 271,868.

*To all whom it may concern:*

Be it known that I, EMIL A. HOEFER, a citizen of the United States of America, residing at Freeport, in the county of Stephenson and State of Illinois, have invented certain new and useful Improvements in Variable-Speed Gears, of which the following is a specification.

My invention relates to variable-speed gearing adapted to be employed in drills and other machines wherein such gearing is desirable or necessary; and it consists of certain new and useful features of construction and combinations of parts hereinafter fully described, and specifically pointed out in the claims appended hereto.

Referring to the accompanying drawings, which form a part of this specification, Figure 1 is a right-side elevation of the upper portion of a drilling-machine provided with my improvements. Fig. 2 is a section at the dotted line 2 2 in Fig. 1. Fig. 3 is a section at the dotted line 3 3 in Fig. 1. Fig. 4 is a central vertical section of parts of the machine, taken through the dotted line 4 4 in Fig. 2. Fig. 5, Fig. $5^a$, and Fig. $5^b$ are side views of the three right-hand semigears shown in Fig. 4 detached from each other.

I have shown my improved gearing applied to a drilling-machine in all substantial respects like that shown in Letters Patent of the United States No. 866,883, issued to myself and others August 9, 1904. I have also shown such gearing substituted for the secondary stepped pulleys employed to feed the drill-spindle of the machine described in that patent automatically downward.

Obviously my invention would be useful in a great variety of machines. I therefore do not wish to be understood as limiting the employment of the same to any particular machine or class of machines by reason of the fact that I have here shown and described it as constituting a part of a drilling-machine.

Like letters of reference indicate corresponding parts throughout the several views.

A, Fig. 1, is the upper portion of the column of a drill-frame provided with trifurcations $A'$ $A^2$ $A^3$, having bearings $A^4$ $A^5$ $A^6$ $A^7$ $A^8$ $A^9$ $A^{10}$ $A^{11}$ $A^{12}$ therein and thereon for supporting parts to be described hereinafter.

B is a drill-spindle sleeve provided with the ordinary operating-rack $B'$ and mounted in the vertical bearing $A^4$.

$B^2$ is a drill-spindle passing through the drill-spindle sleeve B and bevel-gear $B^3$, rotating in and traveling vertically with the former, B, and sliding vertically through and rotating with the latter, $B^3$, by means of spline connection therewith.

C is a horizontal shaft mounted in the part $A'$ and provided with a pinion $C'$ fast thereto and meshing with the rack $B'$ on the drill-spindle sleeve B.

$C^2$ is a worm-wheel fast to the shaft C.

D, Fig. 2, is a vertical shaft provided at its lower end with a worm $D'$, meshing with the worm-wheel $C^2$, and at its upper end with a worm-wheel $D^2$ fast thereto and mounted in the bearing $A^{12}$.

E is a horizontal shaft mounted in the bearing $A^{11}$ and provided at one end with a worm $E'$, constantly meshing with the worm-wheel $D^2$, and at the other end with a stepped gear $E^2$, composed of a plurality of rigidly-connected gear-wheels, as $a$ $a'$ $a^2$, fast thereto. Rotary motion imparted to either of the gear-wheels $a$ $a'$ $a^2$ will be communicated therefrom through the parts E $E'$ $D^2$ D $D'$ $C^2$ C $C'$ to the rack $B'$ and communicated by the latter into a vertical downward movement of the drill-spindle B.

F is a non-rotatable shaft mounted fast in the bearings $A^9$ $A^{10}$.

$F'$ is a collar having peripheral grooves $F^2$ $F^3$ therein and mounted loose on the shaft F.

G is a gear-wheel provided with an integral or rigid hub $G'$, terminating at its free end in actuating-lugs $G^2$ and mounted loose on the shaft F.

$G^3$ is a gear-wheel of larger diameter than the gear-wheel G, provided with an integral or rigid hub $G^4$, terminating at its free end in actuating-lugs $G^5$ and mounted loose on the hub $G'$ of such gear-wheel G concentrically therewith.

$G^6$ is a gear-wheel of larger diameter than the gear-wheel $G^3$, provided at its free end with actuating-lugs $G^7$ and mounted loose on the hub $G^4$ of such gear-wheel $G^3$, concentrically therewith.

The loose-mounted gear-wheels G $G^3$ $G^6$, forming collectively a stepped gear, mesh, respectively, with the rigidly-connected gear-wheels $a^2$ $a'$ $a$, constituting the counterpart stepped gear $E^2$.

H is a gear-wheel, preferably of the same diameter as the gear-wheel $G^6$, having a transverse slot $H'$ in the web thereof flanked by two parallel transversely-projecting bearing-lugs $H^2$ and mounted loose on the shaft F contiguous to the outer face of such gear-wheel $G^6$.

I is a bell-crank lever pivotally mounted at its angle and by means of a pintle $p$ between the lugs $H^2$ and projecting one arm $I'$ into engagement with the groove $F^2$ in the periphery of the collar $F'$ and the other arm $I^2$ through the slot $H'$ in the gear-wheel H into engagement with either of the actuating-lugs $G^2$ $G^5$ $G^7$ of the gear-wheels G $G^3$ $G^6$, according to the speed desired for the shaft E.

J is a lever pivoted on a pintle $J'$, Fig. 2, and having its upper end bent to form a transverse finger $J^2$, engaging the groove $F^3$ in the periphery of the collar $F'$ and provided with a transversely-projecting locking-pin $J^3$, adapted to enter the sockets $J^4$ $J^5$ $J^6$ $J^7$ in the column A, and thereby lock the free end of the arm $I^2$ of the bell-crank I into engagement with either of the gear-wheels G $G^3$ $G^6$, according as desired.

K is a drill-spindle-driving shaft mounted in the bearings $A^6$ $A^7$ $A^8$ and having a stepped pulley $K'$ and a bevel-gear $K^2$ fast thereto, the latter meshing with the bevel-gear $B^3$.

L is a pinion fast to the shaft K and meshing with the gear-wheel H and communicating motion therethrough to the bell-crank lever I and thence to the gear-wheels G $G^3$ $G^6$.

Whenever the lever J is swung and locked to the socket $J^5$, the free end of the arm $I^2$ of the lever I will engage one of the actuating-lugs $G^5$ on the gear-wheel $G^3$ and therethrough rotate the same. If the lever J be thence swung to the left and locked to the socket $J^4$, the free end of the arm $I^2$ of the lever I will be thereby shifted to $g$, Fig. 3, and engage one of the lugs $G^7$ on the gear-wheel $G^6$. Should the lever J be now swung to the right and locked to the socket $J^6$, the free end of the arm $I^2$ of the lever I will be thereby shifted to $g'$ and engage one of the lugs $G^2$ on the gear-wheel G. If the lever J be swung still farther to the right and locked to the socket $J^7$, the free end of the arm $I^2$ of the lever I will be thereby shifted to $g^2$, and the gear-wheel H will run idly and the gear-wheels G $G^3$ $G^6$ will cease rotating.

Having fully described my invention, what I claim as new, and desire to secure by Letters Patent, is—

1. In mechanism of the class described, in combination, a shaft, a plurality of loose gear-wheels, stepped and concentrically mounted thereon, and rotating means adapted to separately and interiorly engage and revolve said gear-wheels, substantially as described.

2. In mechanism of the class described, in combination, a shaft, a plurality of gear-wheels, stepped and mounted loose thereon, and a rotatable lever adapted to separately and interiorly engage and drive each of said gear-wheels, substantially as described.

3. In mechanism of the class described, in combination, a non-rotatable shaft, a plurality of separate gear-wheels, stepped and concentrically mounted thereon, and a rotatable part carrying an arm adapted to separately engage and drive each of said gear-wheels, substantially as described.

4. In mechanism of the class described, in combination, a shaft, a plurality of gear-wheels stepped, a peripherally-grooved collar, and a single gear-wheel, all rotatably mounted on said shaft—the last-mentioned gear-wheel being located between the larger of the stepped gear-wheels and the collar—and a bell-crank lever mounted in bearings on and extending transversely through the single gear-wheel and projecting one arm into engagement with the peripheral groove in the collar and having the other arm adapted to engage—by sliding the collar on the shaft—and separately drive each one of said plurality of gear-wheels, substantially as described.

5. In mechanism of the class described, in combination, a shaft F, a collar $F'$ having a peripheral groove $F^2$ therein and mounted loose thereon, a gear-wheel G provided with an integral or rigid hub $G'$ terminating, at its free end, in actuating-lugs $G^2$ and mounted loose on the shaft F, a gear-wheel $G^3$, of larger diameter than the gear-wheel G, provided with an integral or rigid hub $G^4$ terminating, at its free end, in actuating-lugs $G^5$ and mounted loose on the hub $G'$, of the gear-wheel G, a gear-wheel $G^6$, of larger diameter than the gear-wheel $G^3$, provided, at its free end, with actuating-lugs $G^7$, and mounted loose on the hub $G^4$ of the gear-wheel $G^3$, a gear-wheel H having a transverse slot $H'$ in the web thereof, flanked by two parallel transversely-projecting bearing-lugs $H^2$ and mounted loose on the shaft F, a bell-crank lever I pivotally mounted, at its angle and by means of a pintle $p$, between the lugs $H^2$ and projecting one arm $I'$ into engagement with the groove $F^2$ in the periphery of the collar $F'$, and the other arm $I^2$ through the slot $H'$, the latter arm being adapted to engage and separately drive each one of said gear-wheels G $G^3$ $G^6$, and a pinion L mounted on the main driving-shaft of the machine and meshing with said gear-wheel H, substantially as described.

In testimony whereof I have signed my name to this specification in the presence of two subscribing witnesses.

EMIL A. HOEFER.

Witnesses:
 D. B. BREED,
 CHAS. C. WOLF.